Mar. 27, 1923.   1,449,857
W. G. HAY
RECEIVING AND DISCHARGING APPARATUS OF PNEUMATIC CONVEYERS
Filed Aug. 10, 1920    8 sheets-sheet 1

Inventor.
William George Hay.
Per Ferdinand Bosshardt.
Attorney.

Mar. 27, 1923.
W. G. HAY
RECEIVING AND DISCHARGING APPARATUS OF PNEUMATIC CONVEYERS
Filed Aug. 10, 1920    8 sheets-sheet 2

Inventor.
William George Hay
Per Ferdinand Bosshardt
Attorney.

Mar. 27, 1923. 1,449,857
W. G. HAY
RECEIVING AND DISCHARGING APPARATUS OF PNEUMATIC CONVEYERS
Filed Aug. 10, 1920 8 sheets-sheet 3

Inventor.
William George Hay.
Per Ferdinand Bosshardt.
Attorney.

Mar. 27, 1923. 1,449,857
W. G. HAY
RECEIVING AND DISCHARGING APPARATUS OF PNEUMATIC CONVEYERS
Filed Aug. 10, 1920    8 sheets-sheet 4

Fig.5.

Inventor.
William George Hay.
Per Ferdinand Bosshardt.
Attorney.

Mar. 27, 1923.   1,449,857
W. G. HAY
RECEIVING AND DISCHARGING APPARATUS OF PNEUMATIC CONVEYERS
Filed Aug. 10, 1920    8 sheets-sheet 7

Fig. 8.

Inventor.
William George Hay.
Per Ferdinand Bosshardt.
Attorney.

Patented Mar. 27, 1923.

1,449,857

UNITED STATES PATENT OFFICE.

WILLIAM GEORGE HAY, OF PRESTWICH, ENGLAND.

RECEIVING AND DISCHARGING APPARATUS OF PNEUMATIC CONVEYERS.

Application filed August 10, 1920. Serial No. 402,601.

*To all whom it may concern:*

Be it known that I, WILLIAM GEORGE HAY, subject of the King of Great Britain, residing at Prestwich, in the county of Lancaster, England, have invented certain useful Improvements in and Relating to the Receiving and Discharging Apparatus of Pneumatic Conveyers, of which the following is a specification.

This invention relates to the receiving and discharging apparatus of pneumatic conveyers and is more particularly applicable for use in handling grain, flue dust or the like materials, the object of said invention being to provide an improved automatic apparatus which is substantially continuous in operation and permits of the employment of any suitable type of exhausting device.

I attain this object by the mechanism illustrated in the accompanying eight sheets of drawings.

Figures 3 to 9 are drawn to the same scale, whilst Figures 1 and 2 are drawn to a reduced scale.

Like letters refer to similar parts throughout the various figures.

Figure 4:
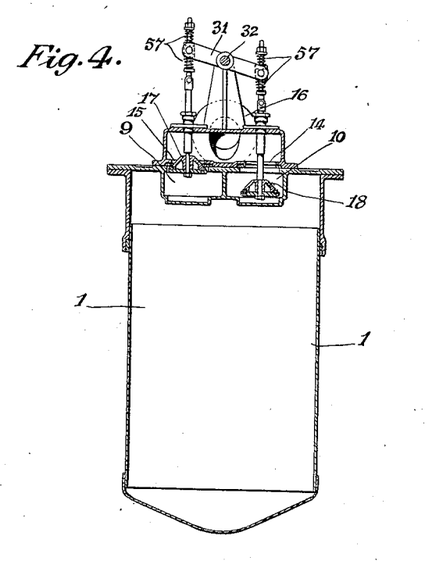
Figure 4 is a vertical section on line A—A of Figure 3.
Figure 5:
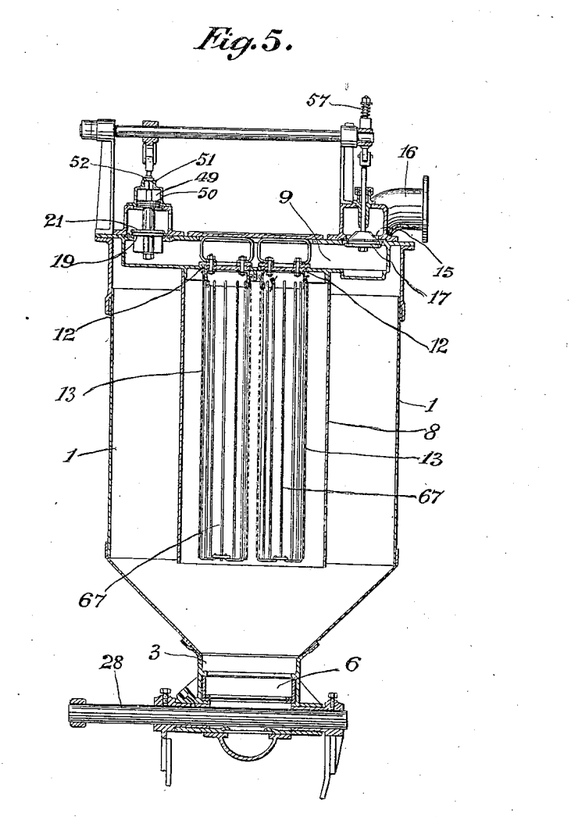
Figure 5 is a vertical section on line B—B of Figure 3.
Figure 6:
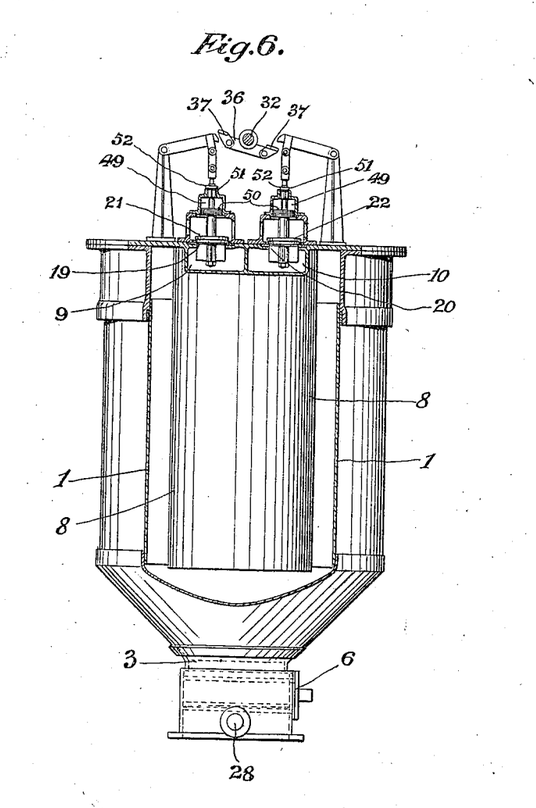
Figure 6 is a vertical section on line C—C of Figure 3.
Figure 7:
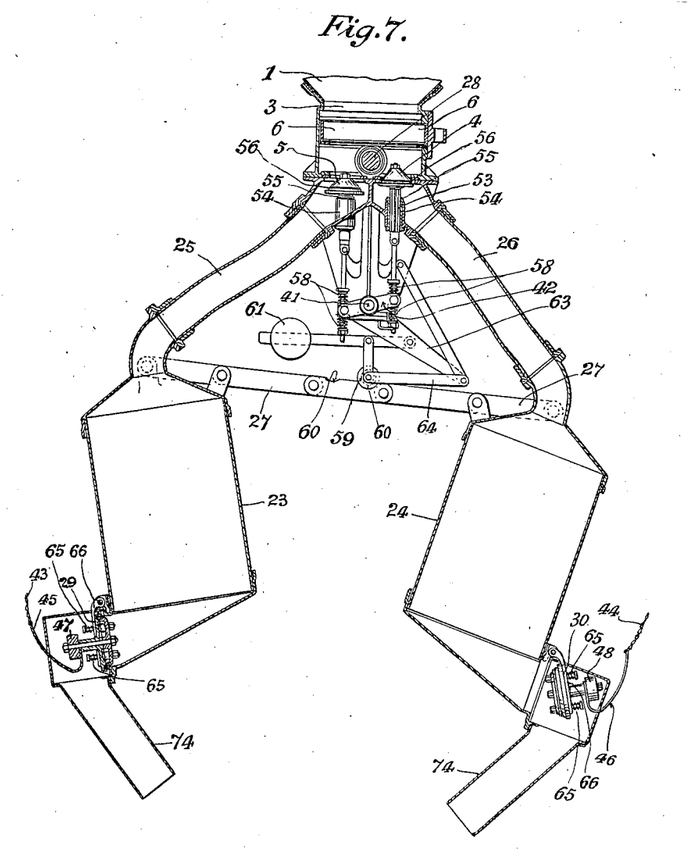
Figure 7 is a vertical section through the discharging chambers and their valve mechanism.
Figure 8:
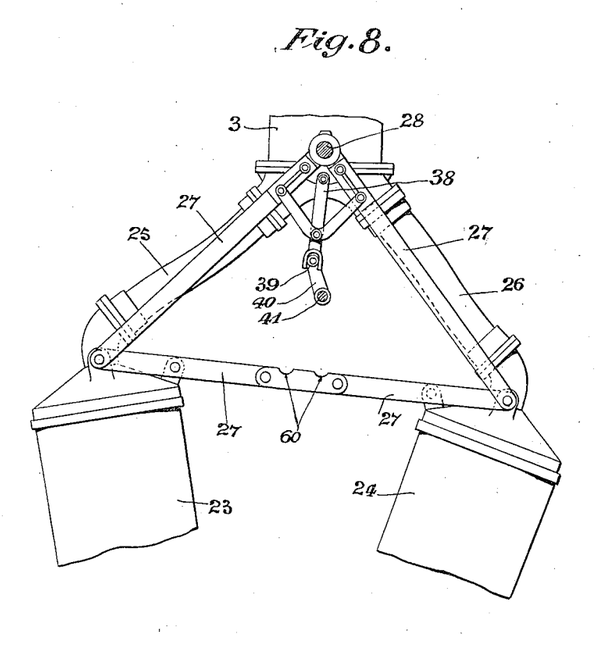
Figure 8 is a detached front elevation of a detail.

In the construction illustrated in Figures 1 to 8 of the drawings, a cylindrical receiver 1 is suspended by suitable means such as a metal framework 2 and is provided at the bottom with a material outlet 3, Figures 4, 5, and 6, controlled by two disc valves 4 and 5, Figure 7, a screen, preferably in the form of a readily removable drawer 6, being provided between the receiver 1 and the disc valves 4 and 5 to intercept foreign matter which is too large to pass through the said valves. A tangential inlet 7 is provided on the receiver 1 for the entrance of the air carrying in suspension the material to be collected and discharged, and the receiver 1 is divided by a partition 8 into an inner and an outer chamber communicating with each other only near the lower end of the receiver 1. A large portion of the suspended matter is therefore separated from the air by centrifugal force. Two passages 9 and 10 are provided at the upper end of the receiver, said passages having sets of openings, for example two 11, 11, and 12, 12, communicating with the inner of said chambers. Each opening 11 and 12 is separated from the inner chamber by a preferably cylindrical filter 13 and therefore forms a filter outlet, and each passage is connected by an outlet 14 and 15 respectively and the pipe 16 with the exhauster (not shown) which may be in the form of an exhauster, steam ejector pump, or any other suitable device. The outlets 14 and 15 are each controlled by a valve 17 and 18 respectively. The laden air entering the receiver 1 must therefore pass through the filters 13 before it can leave the receiver by the pipe 16 and is thereby freed from fine dust. Furthermore by means of the valves 17 and 18 each set of filters 13 can be alternately thrown out of action, for cleansing purposes, without interruption of the continuous operation of the apparatus, the valves 17 and 18 therefore forming filter control valves.

Figure 9:
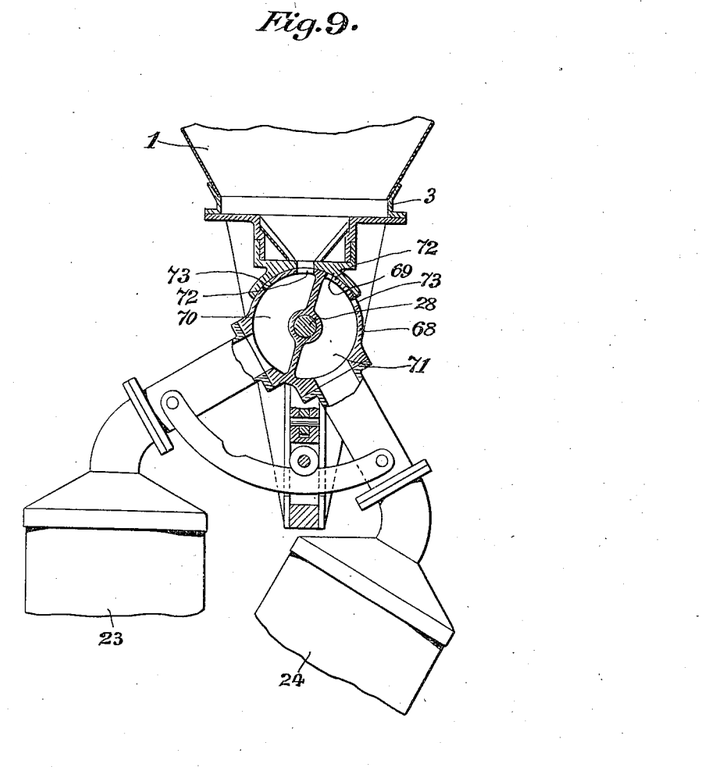
Figure 9 is a detached vertical section illustrating a modification.

In order to cleanse the filter 13, an inlet 19 and 20 respectively communicating with atmosphere is provided on each passage 9 and 10 and valves 21 and 22 are provided in connection therewith for controlling the inlets 19 and 20, the two valves 21 and 22 therefore forming cleansing control valves. In the open position of either of the valves 21 and 22 and the closed position of the corresponding filter control valves 17 and 18 respectively, substantially clean air is drawn direct from atmosphere into the respective passage and from thence, through the set of filters 13 connected therewith, into the receiver 1. The clean air therefore passes in reverse direction through these filters 13 and forces the matter collected in the pores thereof to return into the receiver 1. This air together with the air entering by the receiver inlet 7 passes from the receiver 1 through the second set of filters 13 and the other passage to the exhauster, whereby it is freed from the matter in suspension.

Thus, for example, the cleansing of the filters 13 on the left hand side of Figure 6 i. e., those seen in Figure 5, is effected by opening the valve 21 and closing the valve 17. The passage is thereby opened to the atmosphere and cut off from the exhauster connected to the pipe 16. The valve 22 remains closed and the valve 18 is open with the result that the passage 10 is only open to the exhauster. The suction in the passage 10 therefore operates to draw air from the receiver 1 through the set of filters seen on the right hand side of Figure 6 and through the holes 11 connecting them with the passage 10. The suction produced in the receiver 1 causes air to be drawn through the open valve 21, the passage 9, the holes 12 and the left-hand set of filters 13, air therefore passing through said set of filters in the reverse direction to that which it takes normally and forcing the dust or the like contained in the pores of said filters back again into the receiver 1.

Each of the disc valves 4 and 5 forms an inlet control valve to one discharging chamber 23 and 24 respectively, these chambers being connected to the receiver outlet by flexible tubes 25 and 26 or the like. The discharging chambers 23 and 24 are rigidly connected to a frame 27, see particularly Figures 1, 2 and 8, mounted to swing in relation to the receiver and are provided at the lower end with discharge control valves 29 and 30, the frame being made to swing by preferably being fixed to a main shaft 28 rotatable in a suitable bearing on the receiver outlet 3.

The filter control valves 17 and 18 are operated by an oscillatable lever 31 mounted on a valve control shaft 32 which is operatively connected to the main shaft 28 by a suitable arm and link connection 33, 34, 35. The valve control shaft 32 also carries a tappet lever 36 having a hinged trip or trigger 37 on each arm, which hinged trips or triggers 37 are adapted to alternately lift the cleansing control valves 21 and 22 from their seats and allow such valves to return without interference. The lever 31 operates on the filter control valves 17 and 18 in such a manner that when opening one it automatically closes the other. The frame 27 carries a bracket 38 which engages a pin 39 on an arm 40 fixed to an oscillatable shaft 41. This shaft carries a lever 42 which operates the two inlet control valves 4 and 5 in such a manner that when one of the valves 17 and 18 is opened the other is automatically closed. The discharge control valves 29 and 30 act in co-operation with suitable fixed stops or with chains 43 and 44 secured to the framework 2 and to arc-shaped arms 45 and 46 of the valves 29 and 30. When the discharge chambers swing towards the centre of the apparatus the chains 43 and 44 prevent the valves 29 and 30 from performing a corresponding movement and thereby effect the opening of the same. Closure of the valves 29 and 30 is effected by weights 47 and 48 which move the valves into their closing position when the discharge chambers swing away from the centre of the apparatus.

In operation one set of filters 13 is in operation at a time. In the position of parts shown in the drawings, the right hand set of filters is in operation and the discharging chamber 23 is open to the receiver 1, the discharging valve 29 of this chamber being closed whilst the valve 30 of the other discharging chamber 24 is open. When the chamber 23 has become so full that the weight of the matter therein by acting through the valve operating connections 33, 34, 35 and 38, 39, 40, 41, 42, is sufficient to overcome the atmospheric pressure acting exteriorly on the closed inlet control valve 4 and the cleansing control valve 20 of the filters in action, the two chambers 23, 24 and the supporting frame 27 are caused by such weight to swing with the main shaft 28. The movement of the main shaft 28 closes the filter control valve 18 and opens 17 and thereby throws the right-hand set of filters 13 out of and the left-hand set into action and simultaneously closes the inlet control valve 5 and opens 4 thereby closing the inlet of the chamber 23 and opening that of the chamber 24. The swinging movement of the chambers 23 and 24 at the same time results in the opening of the discharge valve 29 of the chamber 23 and the closing of the discharge valve 30 of the chamber 24. The apparatus therefore continues to operate but with the left-hand set of filters and the discharging chamber 24, until the latter becomes sufficiently heavy to swing the frame 27 and reverse the valves 4, 5 and 17 and 18.

The movement of the main shaft 28 also lifts the cleansing control valve 22 of the right-hand set of filters as they come out of action and produces a flow of air in reverse direction through said set of filters to cleanse same. A similar action takes place in connection with the left hand set of filters on their again becoming inoperative.

In order to obtain an efficient cleansing of the filters 13 and at the same time ensure the closing of the cleansing control valves 21 and 22 before the sets of respective filters are again brought into action I may employ the following construction of valve:— Above the valves proper 19 and 20 respectively I provide a cylinder 49, see particularly Figures 5 and 6 and secure on the valve spindle, a piston 50 which works in the cylinder 49. The valve spindle projects through the top of the cyinder 49 which is formed with an exterior valve seat 51. An auxiliary valve 52 is loosely mounted on the valve spindle and is normally seated on said exterior valve seat 51. When the valve is lifted air is compressed in the cylinder 49 and escapes by lifting the auxiliary valve 52. As soon as the valve proper begins to fall, the auxiliary valve 52 falls on to its seat 51 and prevents an inrush of air into the cylinder 49. The return movement of the valves 21 and 22 are therefore retarded to a degree which can be adjusted by suitably modifying the action of the auxiliary valve 52.

For the purpose of equalizing the pressure in each of the discharging chambers 23 and 24 and allowing their discharge valves 29 and 30 to open freely as they alternately swing into discharging position, a passage 53, Figure 7, open to atmosphere is formed in a guide 54 provided for each of the inlet control valves 4 and 5 and this passage is formed with a valve seat 55 at its inner end. In the rear of the disc of each of the inlet control valves 4 and 5 I then form an auxiliary valve 56 co-operating with said seat. On the closing of each inlet control valve, the movement thereof first lifts the auxiliary valve 56 from its seat 55 and allows air to enter by the passage into the connection between the receiver 1 and the discharging chamber 23 or 24 cut off by said inlet control valve, with the result that each chamber can freely discharge its contents. Part of the air entering through the auxiliary valve 56 rushes into the receiver 1 and cleanses the seat of the inlet valve 4 or 5 thereby allowing it to close freely.

I preferably insert springs 57 between the filter control valves 17, 18 and the lever 31 operating the same springs 58 between the inlet control valves 4, 5 and their connection 42, the arrangement being such that overrunning of the discharge chambers 23 and 24 in swinging is compensated for and proper seating of the valves 17, 18, 4 and 5 is ensured.

Figure 1:
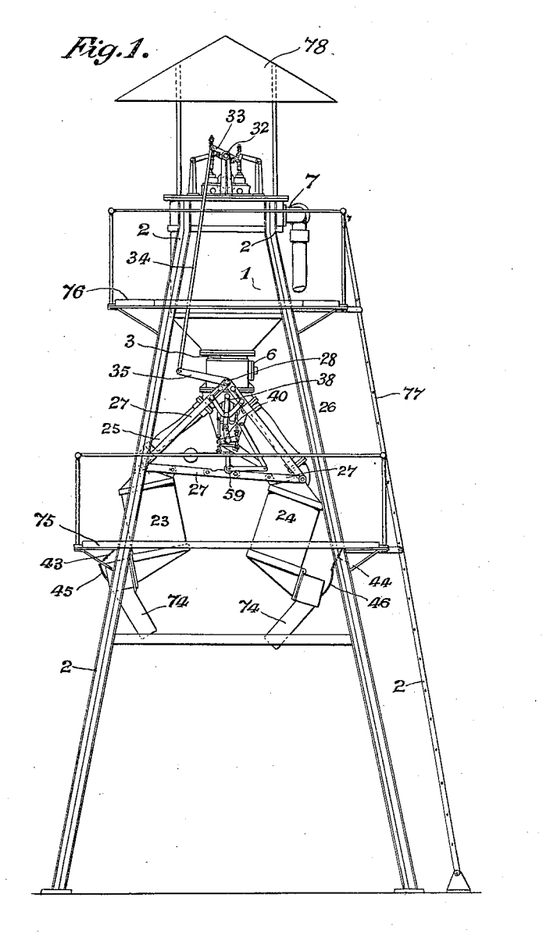
Figure 1 is a general front elevation of the receiving and discharging apparatus of a pneumatic conveyer.
Figure 2:
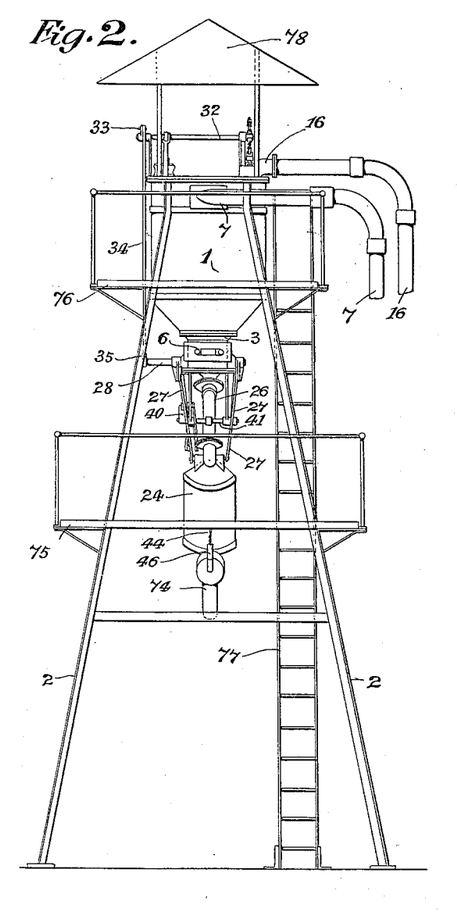
Figure 2 is a general side elevation of the same.
Figure 3:
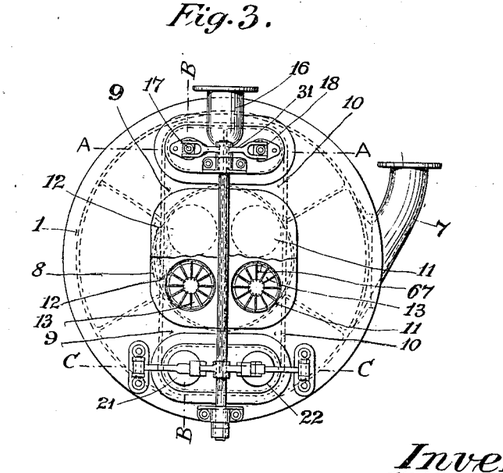
Figure 3 is a detached plan view partly in section, of the receiver.

For the purpose, when starting the apparatus, of preventing the swinging of the discharge chambers 23 and 24 taking place before one of them has been filled, I may provide a yielding stop 59, Figures 1 and 7, to co-operate with notches 60 in the frame 27 and retain the same in either of its end positions until the weight of the matter collecting in one of the discharge chambers 23 and 24 is sufficient to overcome the resistance of the stop 59, which is preferably under the action of an adjustable weight 61 on a lever pivoted on a stationary bracket 63 and linked to a swing arm 64 carrying the stop 59. When the apparatus is in action, the atmosphere pressure on the exterior of one of the inlet control valves 4 and 5 and the cleansing control valves 21, 22 acts in opposite direction to the weight of the material and thereby locks the chambers against movement until the weight of the material in one of same is sufficient to overcome the atmospheric pressure on said valves and the resistance of the yielding stop 59, where such stop is employed.

In order to allow the discharge valves 29 and 30 to close completely, these valves which are preferably of the hinge type, have springs 65 inserted in the connection between them and the hinge hinges 66, whereby they can move relatively to their hinges and be drawn against their seats by the exhausting action in the discharging chambers 23 and 24. The discharge valve arms 45, 46 and 43, 44 are so arranged that the valves are prevented from closing until the discharge chambers 23 and 24 have completed their swinging movement, whereby the valves 29 and 30 become cleansed before closing.

All main valves are preferably provided with rubber rings to ensure a perfect seal. The filters are preferably of filtering cloth formed cylindrical, with one end open, and drawn over wire frames 67, Figures 3 and 5, to prevent collapsing when in use.

According to the modification in construction illustrated in Figure 9, in lieu of employing as inlet valves, two disc valves operated from the main shaft, I may make the connection between the discharging chambers 23 and 24 and the receiver 1 in the form of a rotary valve 68 rigid with the discharge chambers 23 and 24 and turning with the main shaft against a seat 69 provided on the receiver 1. The rotary member 68 of the valve is divided into two chambers 70 and 71 of which one is open to each discharging chamber. Each chamber has also two ports 72, 73 of which 72, serves to bring the chamber into communication with the receiver 1 and 73 to open the discharge chamber to atmosphere. The ports 72 and 73 are so arranged that one of the discharge chambers 23 and 24 is always in communication with the receiver 1 whilst the other is open to atmosphere. In this construction the necessity for flexible tubes or the like is dispensed with as no relative movement takes place between the inlet valve 68 and the discharging chambers 23 and 24. The other parts of the apparatus retain the construction previously described. The modified construction is suitable for dealing with grain, rice or like material, but it is not suitable for dealing with gritty or abrasive material.

The frame work 2 is so arranged that the chambers 23 and 24 can be discharged direct into a vehicle in the well known manner, the chutes 74 being rigidly secured to the chambers 23 and 24 to guide the contents of the chambers into the vehicle.

Platforms 75 and 76 are provided for inspection or repair purposes and are accessible by a ladder 77. The valve mechanism at the top of the framework 2 is protected from weather by the roof 78.

What I claim is:—

1. A receiving and discharging apparatus of a pneumatic conveyer, comprising a receiver; two filters contained in the receiver; a pair of discharging chambers connected to the receiver adapted to swing jointly under the weight of material alternately deposited therein from the receiver; valve members on the receiver controlling the delivery of material to the receiver; valve members between the receiver and the discharging chambers controlling the egress of material from the receiver; discharge valve members on the discharging chambers controlling the egress of material therefrom; means on the receiver adapted to reverse the flow of air through the filters for cleansing them; and valve operating and controlling mechanism operatively connecting said valves to the discharging chambers; whereby the discharging chambers are alternately shut off from the receiver and discharged; and the filters are alternately brought into action and cleansed when momentarily out of action.

2. A receiving and discharging apparatus of a pneumatic conveyer comprising a receiver; filters contained in the receiver; valves on the receiver adapted when opened to bring the interior of the filters into communication with the atmosphere; a trip gear on the receiver adapted to open said valves alternately; and allow them to close again; under their own action; pistons on said valves; cylinders containing pistons; auxiliary valves on said valves controlling the entrance of air to said cylinders and thereby retarding the speed at which the valves close; whereby the valves are prevented from closing before the interiors of the filters have been sufficiently long in communication with the atmosphere for cleansing.

3. A receiving and discharging apparatus of a pneumatic conveyer comprising a receiver; filters in the receiver; filter cleansing valves on the apparatus controlling the direction of flow of air through said filters; swinging discharging chambers connected to the receiver; a disc valve between the receiver and each discharging chamber adapted to control the passage of material from the receiver to the discharging chambers; means on the apparatus operatively connecting the swinging discharging chambers to the filter cleansing valves; and means on the apparatus operatively connecting the swinging discharge chambers to the disc valves and adapted to alternately close one disc valve and open the other by the swing of the discharge chambers against the action of external atmosphere pressure on the closed valves, whereby the possibility of premature movement of the discharge chambers is reduced.

4. A receiving and discharging apparatus of a pneumatic conveyer, comprising a receiver; filters in the receiver, filter cleansing valves on the receiver, swinging discharging chambers connected to the receiver; operative connections between the filter cleansing valves and the swinging chambers adapted to operate said valves to cleanse the filters; a valve between each discharging chamber and the receiver, means on the apparatus operatively connecting said valves to the discharging chambers, and adapted to operate said valves when the discharging chambers swing; atmospheric air inlets at the entrance of the discharging chambers; and means on said valves adapted to close the air inlets alternately by the opening movement of the valves, whereby each discharging chamber is opened to atmospheric pressure when cut off by one of said valves from the receiver and atmospheric air passes through the valves when closing to cleanse the seating surface thereof.

5. A receiving and discharging apparatus of a pneumatic conveyer comprising a receiver, filters in the receiver; filter cleansing means on the receiver; swinging discharging chambers connected to the receiver; means operatively connecting the discharging chambers to the filter cleansing means; a double valve member between the receiver and the discharging chambers and rigidly connected to the discharging chamber; a valve seating surface on the receiver co-operating with the double valve member; a port in said valve surface co-operating with ports in the double valve member; and ports in the double valve member adapted to communicate with atmosphere.

6. A receiving and discharging apparatus of a pneumatic conveyer comprising a receiver; filters contained in the receiver; valve mechanism on the receiver governing the direction of flow through the said filters; rigidly connected discharging chambers oscillatably mounted in relation to the receiver and operatively connected to said valve mechanism; means between the receiver and the discharging chambers adapted to control the flow of material from the receiver to the discharging chambers, outlets on the discharging chambers, discharge valves on said outlets; and means connected to said valves adapted to limit movement of the valves in one direction; whereby swinging movement of the discharge chambers automatically closes one discharge valve and opens the other.

7. A receiving and discharging apparatus of a pneumatic conveyer comprising a receiver; filters contained in the receiver;

valve mechanism on the receiver controlling the direction of flow through said filters; a pair of rigidly connected discharging chambers oscillatably mounted in relation to the receiver and operatively connected to said valve mechanism; means between the receiver and the discharging chambers adapted to control the flow of material from the receiver to the discharging chambers; outlets on the discharging chambers; hinged members at said outlets; and discharge valves yieldingly connected to said hinged members, whereby an air tight seating of the discharge valves is ensured.

8. A receiving and discharging apparatus for a pneumatic conveyer comprising a receiver, filters contained in the receiver; valve mechanism on the receiver controlling the direction of flow through said filters; swinging discharging chambers connected to said receiver; valve mechanism on the receiver and between the receiver and the discharging chambers to control the removal of air from the receiver and the flow of material into the discharging chambers; means operatively connecting the discharging chambers to said valve mechanism and causing said mechanism to be actuated by the swinging movement of the discharging chambers; and a yielding stop co-operating with the discharging chambers adapted to prevent the discharging chambers from swinging prematurely when the apparatus is started up.

9. A receiving and discharging apparatus for a pneumatic conveyer comprising a receiver; filters contained in the receiver; valve mechanism on the receiver controlling the flow through said filters; a shaft oscillatably mounted at the lower end of the receiver; a frame rigidly secured to said shaft; a pair of discharging chambers fixed on said frame and communicating with the receiver, valve mechanism on the receiver to control the withdrawal and entrance of air to the receiver and to control the flow of material from the receiver to the discharging chambers and means operatively connecting said shaft to all of said valve mechanisms; whereby the weight of a full discharge chamber causes the frame and shaft to swing and operate said valve mechanisms, and the empty discharge chambers to ascend.

Signed at Manchester, in the county of Lancaster, England, this 29th day of July, 1920.

WILLIAM GEORGE HAY.

Witnesses:
  ALFRED BOSSHARDT,
  MARY I. BOSSHARDT.